Oct. 6, 1936. E. S. WINN 2,056,814
OUTDOOR BATTERY BROODER
Filed Dec. 2, 1932  3 Sheets-Sheet 3
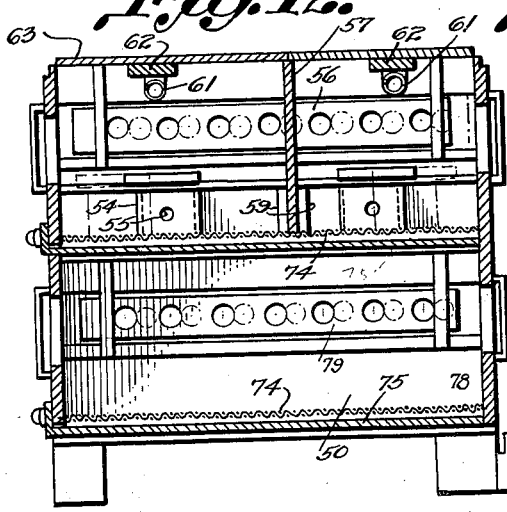
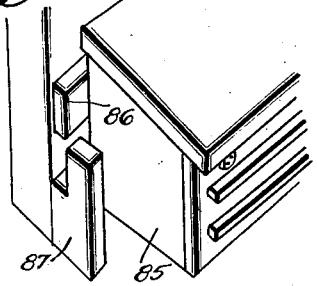
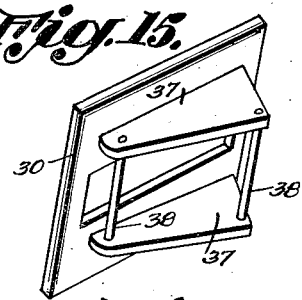
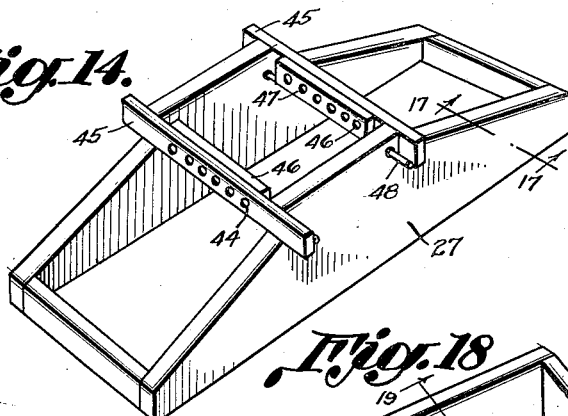
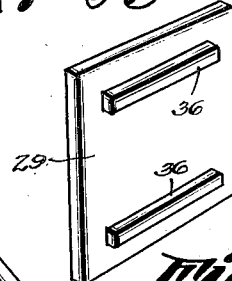
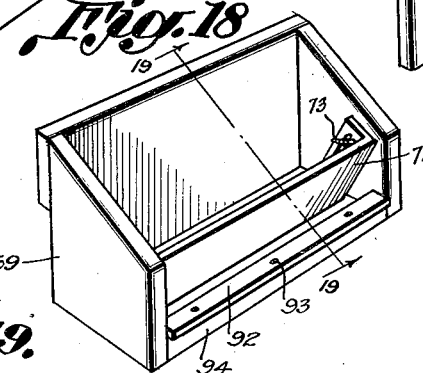
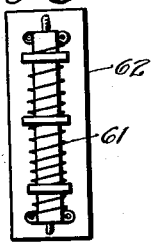
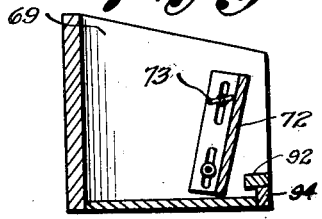
Inventor
Elisha S. Winn
By Miller & Miller
Attorneys Patented Oct. 6, 1936

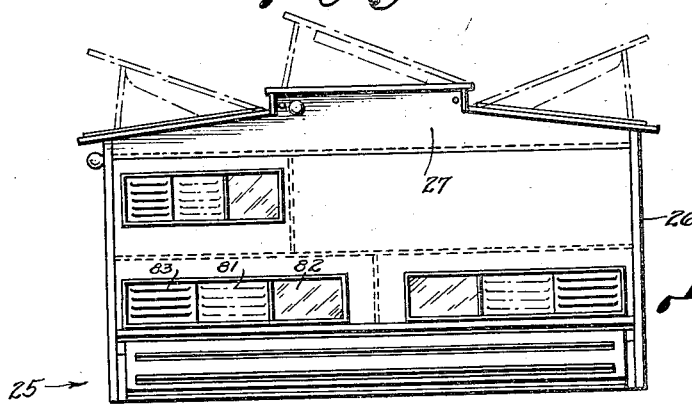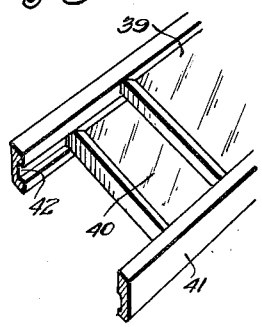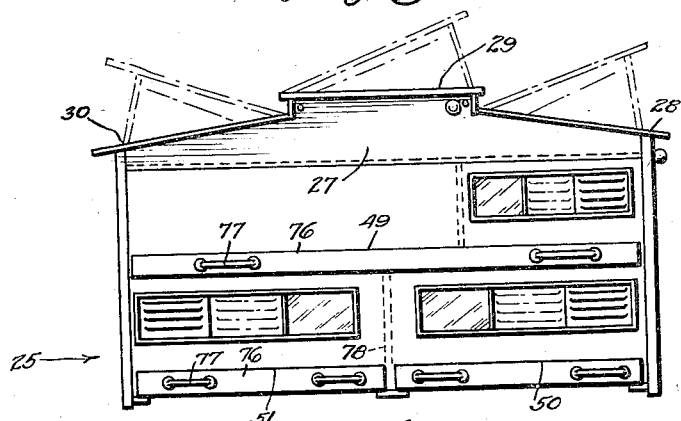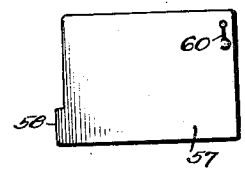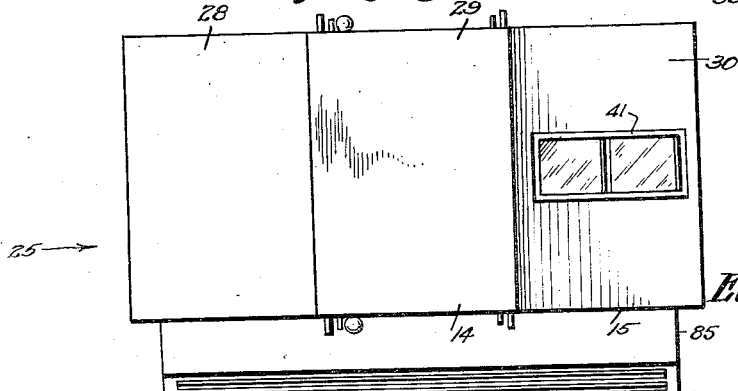

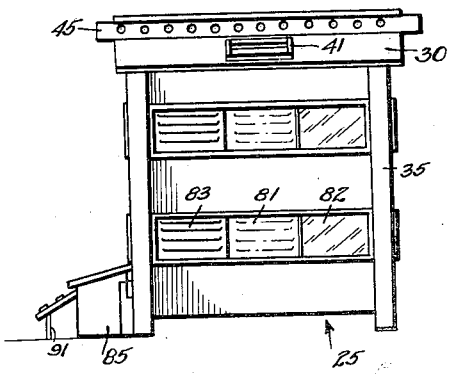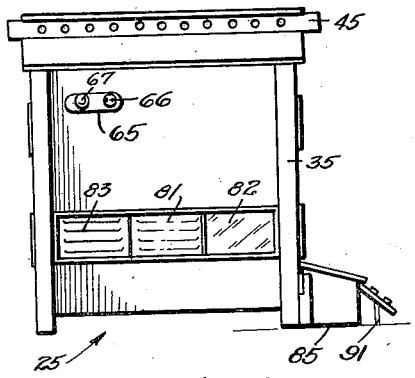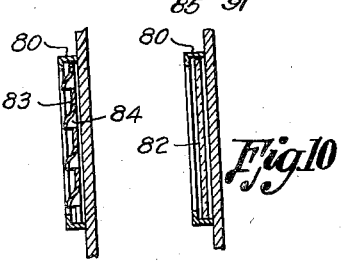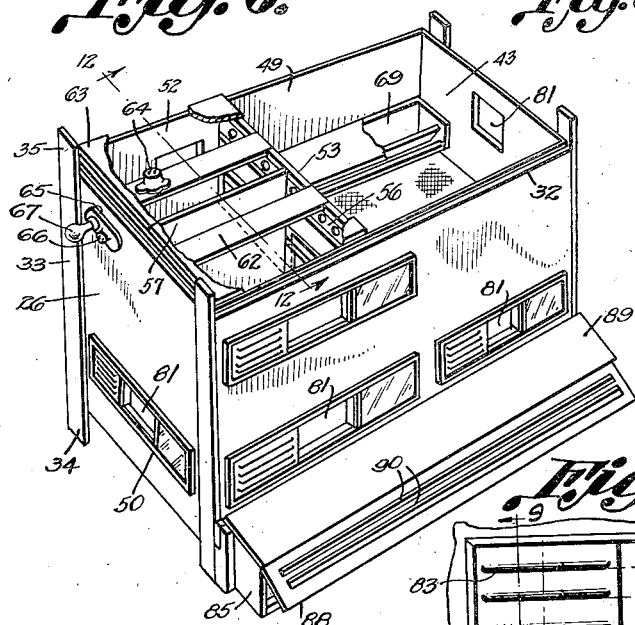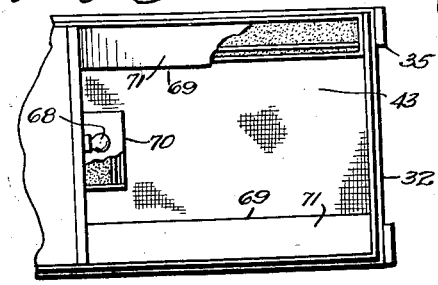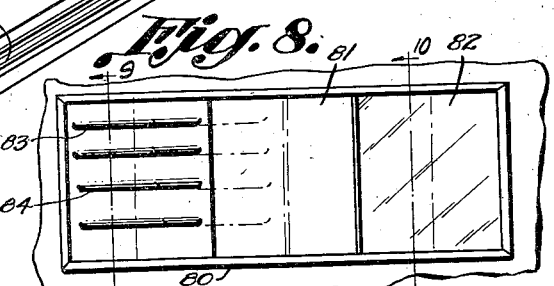

2,056,814

UNITED STATES PATENT OFFICE 2,056,814

OUTDOOR BATTERY BROODER

Elisha S. Winn, Fitzgerald, Ga.

Application December 2, 1932, Serial No. 645,460

4 Claims. (Cl. 119—33)

This invention relates to an outdoor battery brooder and has for an object to provide an improved outdoor battery brooder suitable for poultry of any nature, such as, chickens, ducks, turkeys, quails, pheasants or other fowl.

Still a further object of this invention is to provide an outdoor battery brooder wherein the poultry receive the proper amount of ventilation, of sunshine and of heat and wherein means are provided for adjusting the amounts of ventilation, sunshine and heat as may be desired.

Still a further object of this invention is to provide a battery brooder wherein poultry of several ages may be kept, whereby the youngest poultry is kept in one location where it is protected entirely within the brooder, yet has proper amount of heat, air and sunshine, and then may be moved to a second location where it is possible to gain access to the surrounding yard.

Still a further object of this invention is to provide an outdoor battery brooder having sanitation means, whereby the droppings may be removed easily and quickly without disturbing the poultry and without seriously interfering with the ventilation or heating of the brooder.

Yet a further object of this invention is to provide an outdoor battery brooder which may be made of several sizes and in which when the amount of poultry is less than the full capacity of the brooder, the brooder may be adjusted to fit the lesser quantity of poultry and the heating expense may be proportionately reduced.

Yet an additional object of this invention is to provide a heated brooding chamber wherein the baby poultry are absolutely shielded against the outdoor weather and yet have the proper amount of sunshine, fresh air and heat.

Yet an additional object of this invention is to provide feeding facilities for the baby poultry whereby they may be fed without exposure and which feeding facilities are automatic, yet adjustable, according to the type of feed that is being used according to the age of the poultry.

Yet an additional object of this invention is to provide an outdoor battery brooder which may be easily dismantled either for shipping or for moving about one's premises.

Still a further object of this invention is to provide an improved battery brooder including an adjustable window and ventilator which may be adjusted to give desired amounts of fresh air and sunshine in any required ratio.

With the foregoing and other objects in view, as will hereinafter become apparent, this invention comprises the constructions, combinations and arrangements of parts, hereinafter set forth, disclosed, and shown on the accompanying drawings. In these drawings, Figure 1 is a side elevation of the poultry brooder.

Figure 2 is a side view of the brooder on the opposite side of Figure 1.

Figure 3 is a top plan view of the brooder.

Figure 4 is a back end view of Figure 1.

Figure 5 is a front end view of Figure 1.

Figure 6 is a perspective view, the top ventilating section being removed.

Figure 7 is a plan view of the feeding chambers.

Figure 8 is an enlarged front elevation of one of the ventilators.

Fig. 9 is a vertical section through the vent on line 9—9 of Fig. 8.

Fig. 10 is a vertical section through the window on line 10—10 of Fig. 8.

Fig. 11 is an elevational view of the roof peg or prop.

Figure 12 is a sectional view taken on line 12—12 of Figure 6, the feeder-hopper being removed.

Figure 13 is an enlarged perspective of one end of the feeder-hopper.

Figure 14 is a perspective view of the top ventilating section.

Figure 15 is a perspective view of the bottom of one of the inclined ventilators in the top.

Figure 16 is a bottom perspective of the top center ventilator.

Figure 17 is a sectional view taken on line 17—17 of Figure 14.

Figure 18 is a perspective view of the feeder-hopper.

Figure 19 is a sectional view taken on line 19—19 of Figure 18.

Figure 20 is a bottom view of one of the heating bars.

Figure 21 is a perspective view of one of the top windows.

Figure 22 is a side elevation of the division board shown in Figure 6.

There is shown at 25 the outdoor battery brooder comprising this invention. This battery brooder 25 consists of a house section 26 and a ventilating top section 27, on which are placed three removable roof sections, a front section 28, a middle section 29 and a rear section 30. The top section 27 is fitted on the house section 26 by means of the lapped joint 31 on the lower edge of the top section 27 cooperating with the complementary lapped joint 32 on the upper edge of the house section 26.

A plurality of posts 33 are secured at each corner to the house section 26 depending therebelow to provide supporting legs 34 and projecting above to provide embracing arms 35 between which the top section 27 is placed. The center roof section 29 is provided with a pair of attached flange boards 36 so that the middle roof section 29 will fit securely on the top section 27 without being nailed or hinged thereto. As a result of these flange members 36 the roof section 29 may be raised at any side or end and supported in such position by a peg or prop 95, as shown in dotted outline in Figure 1.

As will be apparent, the direction that the roof section 29 will be raised will depend on the direction of the wind at the time. Similarly, roof sections 28 and 30 are provided with depending flange arms 37, which flange arms 37 have reinforcing bars 38 to strengthen them. The end roof sections 28 and 30 may be similarly raised to tilt to any desired degree and be supported in such direction by a peg member or prop 95 placed therebelow, as likewise shown in dotted outline in Figures 1 and 2. The rear roof section 30 is provided with a pair of glass panels 39 and 40 mounted in a framework 41 thereon. As will be observed partly from Figure 21, the framework 41 is grooved as at 42 permitting the panel 40 to be moved to open or closed position while the panel 39 is fixed in position.

The two end roof sections may be individually raised a substantial amount by the props as shown so as to provide side and end ventilation. If end ventilation alone is desired, the roof sections may be raised and slid a slight distance along so as to be supported on the flanges or abutments. When so supported, only end ventilation will take place inasmuch as the abutment will prevent side ventilation. If a greater degree of ventilation is desired, the outer roof sections may be reversed end for end, bringing the larger section of the abutments adjacent the end walls of the brooder to hold the roof with a larger degree of end elevation, or alternately short props may be used to raise the roof sections an amount less than the width of the abutments, thereby providing only end elevation.

As a result of the inclusion of these window panels in the top section 30, sunshine is admitted directly to the feed chamber 43 for the baby poultry or chicks in the house section 26. The top section 27 is provided with additional ventilation means consisting of a plurality of holes 44 projecting through the cross braces 45 and a slidable shutter 46 having similar holes 47 which may be brought into registry with the holes 44 by means of the control handle 48 projecting through the side of the top section 27, thus permitting this ventilating means to be opened or closed as may be desired.

The house section 26 is divided into three compartments, a top compartment 49 and two lower compartments 50 and 51. The top compartment 49 is intended for small poultry such as baby chicks, and is sub-divided into two chambers, a brooder chamber 52 and a feed chamber 43. The brooder chamber 52 is partitioned from the feed chamber 43 by means of a dividing wall 53 through which are provided one or more slidable doors 54 having finger holes 55 for controlling the operation thereof. A slidable ventilating shutter 56 is likewise provided in the partition wall 53 and permits interchange of air and heat between the two compartments, as desired. These doors may be controlled in operation by placing one's hand through the windows in the sides of the house section.

In a large size brooder two doors will preferably be provided, thus permitting the brooding chamber to be sub-divided into two sub-chambers by means of a removable division wall 57, which is clearly shown in Figure 22. To secure this division wall 57 in place, a tongue 58 is placed in the groove formed by a pair of flange members 59 on the division wall 53, while hook 60 on the diagonally opposite corner is secured to the inside wall of the house section 26. As a result of the use of this partition wall, the usable portion of the brooder may be made smaller to accommodate a lesser number of chicks, thus requiring less heating expense.

A heating unit, diagrammatically shown at 61, is secured to the bottom of a supporting bar 62 as shown in Figure 20, and an inside cover member 63 is placed thereover as shown in broken section in Figure 6, this cover being preferably made in two sections for ease of removal when the roof section 28 is raised. The particular electrical heating unit diagrammatically shown forms no part of this invention and any other type of suitable heating unit may be provided. A plug-in receptacle member 64 is provided for electrically connecting the heating units to a thermostat member projecting through the side of the house section 26, diagrammatically shown at 65. All the heating units in the upper and lower batteries are provided with similar plug-in receptacles so that they may all be connected up either to a direct power supply or to the same thermostat member 65, which in itself has a plug-in receptacle 66 for receiving electrical current therein, while a pilot light 67 is provided to show whether or not the heating units are in operation.

The feed chamber 43 has a lamp 68 wired therein whereby continuous light may be provided for lengthening the feeding time and thus increasing the growth of the poultry. This feed chamber 43 is provided with a pair of feeder-hoppers 69 and a grit hopper 70. The feeder-hoppers 69 are each provided with a cover 71 and an adjustable feed board 72. A detachable bar 92 is secured by screws 93 to the front edge 94 of the feeder-hopper. This bar is omitted during the first few days that a new batch of baby chicks have access thereto, but when the chicks get slightly older this bar is attached in the manner shown so that the chicks may feed thereover. It will be noted that the bar 92 is wider than the edge 94 overhanging the same thereby providing defense against waste of feed by the chicks throwing the feed out with their bills. As will be observed from Figures 18 and 19, this adjustable feed board 72 may be secured in different positions by means of the wing nut 73 to control the flow of the feed according to the mixture and texture, for it will be obvious that different adjustments are desired according to different feed mixtures depending on the age of the poultry therein, for as the poultry gets older the mixture will be changed all with a view to forcing the growth as rapidly as possible.

The floor of each battery is made of a wire mesh 74, the mesh being such as to provide suitable support for the poultry walking thereover but allowing the droppings to pass therethrough onto the dropper boards 75. These dropper boards 75 may be covered with paper or a suitable mixture of sand or the like to permit the boards to be easily cleaned when they are withdrawn by means of the flanges 76 and handles 77 exterior of the house section 26, as clearly shown in Figures 2 and 12. As will be apparent, the droppings may be removed and fresh litter placed on the board 75 without disturbing the poultry in any manner.

The lower compartments 50 and 51 are divided from each other by a partition board 78, which is preferably removable to permit the two compartments to be joined into one when desired. A ventilator 79 is provided in this partition board permitting ventilation from one compartment to the next. Each compartment is provided with a plurality of windows preferably three as shown. Each of these windows is substantially identical in construction as shown in Figures 8 to 10 and consists of a grooved framework 80 placed on the side of the house section extending beyond a window opening 81. A glass panel 82 is provided in the grooved framework 80 on one side of the window opening 81 and a metal ventilator 83 having downwardly turned louvres 84 therethrough is provided in the other end of the framework 80.

As shown in Figure 6, the window 82 and ventilator 83 may be so placed as to allow an unobstructed opening through the window opening 81. In Fig. 8 a schematic dot-dash diagram is shown with the window 82 and ventilator 83 each partially obstructing the window opening 81, thus allowing the sunshine and air through the window to be set at any desired ratio. In the compartment 49 the windows 81 are set a distance above the floor 74 so as to keep the baby poultry or chicks therein even though the window be open. In the lower compartments 50 and 51 the windows 81 are placed at the floor level permitting the poultry therein to make its exit into the poultry yard when the windows are open.

A feeder-hopper 85 is provided across one side of the house section 26, a pair of projecting ears 86 being provided on the feeder-hopper 85 to cooperate with a pair of recessed flanges 87 secured to the side feet 34 of the house section 26 for detachably securing the feeder-hopper in position. This feeder-hopper is similar in interior construction to the feeder-hopper 69 above described.

A front wall 88 is hinged to the top 89 and is provided with a pair of strips 90 to act as a mounting board when secured in supported and partly raised position as by a depending peg 91 permitting the poultry to climb thereover and through the windows 81 into the lower compartments 50 and 51.

In operation, the brooder is used for raising poultry until it is ready for the market. Young poultry such as day old chicks are placed in the upper compartment 49 being kept preferably in the brooding chamber 52 except when it is desired that they should feed in the feeding chamber 43. When this is desired, the door 54 may be opened by passing the hand through the adjacent window 81, permitting the chicks to enter the feed chamber 43. As is well known, baby chicks must not be allowed to become chilled or they will die and heating means provided is ample to keep them comfortable until they are about two to three weeks old. At this time it becomes necessary to allow them access to the outside and they are then placed in one of the lower compartments and a new batch of baby chicks are placed in the upper compartment. The chicks in the lower compartment may go out into the poultry yard when windows 81 have been opened and then return over the mounting board provided by the front wall 88 of the feeder-hopper 85.

At the proper age the second batch of chicks is placed in the other lower compartment and a third batch placed in the upper compartment. When the third batch is ready to be placed in the lower compartment, the first batch will be ready for market, thus rating the capacity of the brooder and as each successive batch is placed in the upper compartment another batch is removed from the lower compartment for the market.

As a result of the tiltable and removable roof sections and slidable windows provided, sunshine and ventilation may be absolutely controlled as desired by the poultry man. The heating is likewise controlled by proper manipulation of the electrical current. By means of this brooder a very large amount of poultry may be raised for the market very rapidly in a small poultry yard with the poultry all under perfect control insofar as health conditions are concerned. With this brooder placed outdoors plenty of sunshine is available for the growing poultry, the amount of sunshine being controlled by proper manipulation of the roof sections and the ventilator and window sections. If the batch of baby chicks is too small to make use of the brooder chamber 52, the partition will 57 will be used thus eliminating the necessity for heating the other unused chamber and the heating unit of the unused chamber may then be disconnected.

When it is desired to transport this brooder or move it about one's premises, the different parts thereof may be easily detached as will be obvious from the above description. When closed up the brooder is absolutely weather-tight permitting ventilation to be controlled as desired. Proper sanitation is assured because the droppings may be removed easily and conveniently without soiling one's hands.

The novel features and the operation of this device will be apparent from the foregoing description. While the device has been shown and the structure described in detail, it is obvious that this is not to be considered limited to the exact form disclosed, and that changes may be made therein within the scope of what is claimed without departing from the spirit of the invention.

Having thus set forth and disclosed the nature of this invention, what is claimed is:

1. A battery brooder comprising a house section, a plurality of compartments in said house section, exit means in said house section from said compartments, a feeder-hopper detachably secured to said brooder at one of said exit means, a top wall on said feeder hopper, a front wall hinged to said top wall, and means to support said front wall in inclined position to provide a mounting board for entrance to said exit means.

2. A battery brooder comprising a house section, a plurality of compartments in said house section, exit means in said house section from said compartments, a feeder-hopper, means for detachably securing said feeder-hopper to said battery brooder, said means comprising a pair of recessed flanges on said brooder, and a pair of cooperating projecting ears on said feeder-hopper, a top wall on said feeder hopper, a front wall hinged to said top wall, and means to support said front wall in inclined position to provide a mounting board to said exit means.

3. A battery brooder comprising a house section, a plurality of compartments in said house section, exit means in said house section to said compartments, a feeder-hopper, means for detachably securing said feeder-hopper to said battery brooder, said means comprising a pair of recessed flanges on said brooder, and a pair of cooperating projecting ears on said feeder-hopper, a top wall on said feeder-hopper, a front wall hinged to said top wall, strips secured to said front wall whereby said front wall provides a mounting board for said exit means when said front wall is hinged upwardly.

4. An outdoor battery brooder having a roof of the monitor type said roof comprising a central horizontal roof section and a pair of sloping roof sections, one of said sloping roof sections being on each side of said horizontal roof section, and means for independently supporting said roof sections at desired individual angles to control the ventilation therethrough, said means on each of said sloping roof sections including a pair of spaced substantially triangular shaped abutments depending from the underside of said sloping roof section whereby said sloping roof section may be raised to permit side and end ventilation therethrough or may be turned end to end to permit only end ventilation therethrough.

ELISHA S. WINN.